United States Patent
Chen et al.

(10) Patent No.: US 11,842,568 B2
(45) Date of Patent: Dec. 12, 2023

(54) FEATURE SURFACE PROJECTION SYSTEM AND PROJECTION METHOD FOR FEATURE SURFACE

(71) Applicant: Coretronic Corporation, Hsin-Chu (TW)

(72) Inventors: Chia-Tien Chen, Hsin-Chu (TW); Wen-Chieh Chung, Hsin-Chu (TW); Hung-Pin Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 121 days.

(21) Appl. No.: 17/191,596

(22) Filed: Mar. 3, 2021

(65) Prior Publication Data
US 2021/0279448 A1    Sep. 9, 2021

(30) Foreign Application Priority Data

Mar. 6, 2020    (CN) .......................... 202010149709.3

(51) Int. Cl.
*G06T 7/33* (2017.01)
*G06V 40/16* (2022.01)
(Continued)

(52) U.S. Cl.
CPC .............. *G06V 40/174* (2022.01); *G06T 7/33* (2017.01); *G06V 10/145* (2022.01); *H04N 5/33* (2013.01);
(Continued)

(58) Field of Classification Search
CPC ...... G06V 40/174; G06V 10/145; G06T 7/33; G06T 2207/30201
See application file for complete search history.

(56) References Cited

U.S. PATENT DOCUMENTS 7,440,590 B1   10/2008  Hassebrook et al.
8,439,505 B2 *  5/2013  Yoshizawa ........... H04N 9/3194
                                                  353/30
(Continued)

FOREIGN PATENT DOCUMENTS

CN        101464745        6/2009
CN        103020954        4/2013
(Continued)

OTHER PUBLICATIONS

Inside the Magic, "Disney experiments with face projection mapping, animating digital skin on live actor in real time" Apr. 25, 2017, pp. 1-13, Available at: https://insidethemagic.net/2017/04/disney-experimehts-face-projection-mapping-animating-digital-skin-live-actor-real-time/.
(Continued)

*Primary Examiner* — Ian L Lemieux
(74) *Attorney, Agent, or Firm* — JCIPRNET

(57) ABSTRACT

A feature surface projection system includes a projector, a camera, and a controller. The projector projects a structured light and an image beam to a feature surface at different times. The structured light forms a structured light pattern on the feature surface, and the image beam forms an image on the feature surface. The camera photographs the structured light pattern and the image at different times. The controller is electrically connected to the projector and the camera, calculates a position of a feature point of the feature surface, and determines a difference between a position of a feature point of the image and the position of the feature point of the feature surface to determine whether to adjust the image beam. A projection method for a feature surface is also provided. The feature surface projection system provides an automatic alignment function between a projected content and the feature surface.

14 Claims, 6 Drawing Sheets

(51) Int. Cl.
   *H04N 5/33*      (2023.01)
   *H04N 9/31*      (2006.01)
   *G06V 10/145*    (2022.01)

(52) U.S. Cl.
   CPC . *H04N 9/3176* (2013.01); *G06T 2207/30201* (2013.01)

(56) References Cited

U.S. PATENT DOCUMENTS

| | | | | |
|---|---|---|---|---|
| 9,049,369 | B2* | 6/2015 | Vieth | H04N 5/74 |
| 9,197,887 | B2* | 11/2015 | Cho | H04N 9/3185 |
| 9,261,759 | B1* | 2/2016 | Haskin | H04N 9/3194 |
| 11,228,709 | B2* | 1/2022 | Athreya | G06V 10/225 |
| 2009/0292614 | A1* | 11/2009 | Reichow | G09F 19/18 345/173 |
| 2013/0242110 | A1* | 9/2013 | Terre | A62B 18/02 29/592.1 |
| 2015/0015699 | A1* | 1/2015 | Vieth | G06V 20/00 348/135 |
| 2016/0209740 | A1* | 7/2016 | Grundhofer | G06T 13/80 |
| 2016/0231645 | A1* | 8/2016 | Mahoor | G03B 21/10 |
| 2016/0381331 | A1* | 12/2016 | Sprenger | H04N 9/3188 348/745 |
| 2017/0329139 | A1* | 11/2017 | Shearman | H04N 9/3141 |
| 2018/0019035 | A1 | 1/2018 | Baturin | |
| 2018/0190035 | A1 | 7/2018 | Grundhofer et al. | |
| 2019/0012578 | A1* | 1/2019 | Bhagavatula | G06T 17/00 |
| 2019/0228195 | A1* | 7/2019 | Lozano | G06K 7/1417 |
| 2020/0114521 | A1* | 4/2020 | Mahoor | G06F 3/147 |
| 2020/0286284 | A1* | 9/2020 | Grabli | G06T 13/40 |
| 2020/0297055 | A1* | 9/2020 | Fringero | G09F 19/00 |
| 2021/0232808 | A1* | 7/2021 | Nguyen | G06V 10/141 |

FOREIGN PATENT DOCUMENTS

| | | | | |
|---|---|---|---|---|
| CN | 203070268 | | 7/2013 | |
| EP | 3438790 | | 2/2019 | |
| FR | 3012227 | A1* | 4/2015 | G03B 21/10 |
| JP | 2008287157 | | 11/2008 | |
| TW | 200841109 | | 10/2008 | |

OTHER PUBLICATIONS

"Office Action of China Counterpart Application", dated Nov. 30, 2022, p. 1-p. 13.

* cited by examiner

FEATURE SURFACE PROJECTION SYSTEM AND PROJECTION METHOD FOR FEATURE SURFACE

CROSS-REFERENCE TO RELATED APPLICATION

This application claims the priority benefit of China application serial no. 202010149709.3, filed on Mar. 6, 2020. The entirety of the above-mentioned patent application is hereby incorporated by reference herein and made a part of this specification.

BACKGROUND

Technical Field

The disclosure relates to a projection system, and in particular, to a feature surface projection system.

Description of Related Art

In recent years, the projector has been widely used in face projection, such as face projection for dynamic expressions of service robots, digital makeup for movies, face art creation, etc. The projection of content greatly increases the extendibility at the application end, which can generate dynamic expressions, increase interactivity, simplify the makeup test procedures, and can also be used for artistic creation and entertainment performances.

The principle of face projection involves using a projector to project content on a human face or a face mask, and face projection may be divided into two methods, i.e., front projection and rear projection. With the screen as the boundary, if the viewer and the projector are on the same side, it is the front projection method. If they are on different sides, it is the rear projection method.

In such applications, the projected content needs to be accurately mapped to the physical human face or face mask, and the relative position of the projector with respect to the human face or face mask becomes very important. In the application of front projection, if the human face moves or the position of the human body changes, the position of the projection module needs to be re-adjusted, or the effect of dynamic mapping cannot be achieved. Whether in the application of front projection or rear projection, an adjust mechanism is required so that the projected content is accurately mapped to the human face or face mask. However, such adjustment is time-consuming, and when the human body or face mask moves, it is necessary to perform re-adjustment. As a result, the automatic alignment function cannot be achieved.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a feature surface projection system, which provides an automatic alignment function between a projected content and a feature surface.

The disclosure provides a projection method for a feature surface, which can align a projected content with a feature surface.

An embodiment of the disclosure provides a feature surface projection system including a projector, a camera, and a controller. The projector is configured to project a structured light and an image beam to a feature surface at different times. The structured light forms a structured light pattern on the feature surface, and the image beam forms an image on the feature surface. The camera is configured to photograph the structured light pattern and the image at different times. The controller is electrically connected to the projector and the camera, is configured to calculate a position of a feature point of the feature surface according to the structured light pattern, and is configured to determine a difference between a position of a feature point of the image and the position of the feature point of the feature surface to determine whether to adjust the image beam.

An embodiment of the disclosure provides a projection method for a feature surface, including the following steps. A structured light and an image beam are projected to a feature surface at different times. The structured light forms a structured light pattern on the feature surface, and the image beam forms an image on the feature surface. The structured light pattern and the image are photographed at different times. A position of a feature point of the feature surface is calculated according to the structured light pattern. A difference between a position of a feature point of the image and the position of the feature point of the feature surface is determined to determine whether to adjust the image beam.

Based on the above, in the feature surface projection system and the projection method for a feature surface of the embodiments of the disclosure, since the structured light and the image beam are projected to the feature surface at different times, and the structured light pattern and the image are photographed at different times, it is possible to align the projected content with the feature surface to thereby improve the accuracy and the visual effect of the projected image.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is infrared light.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
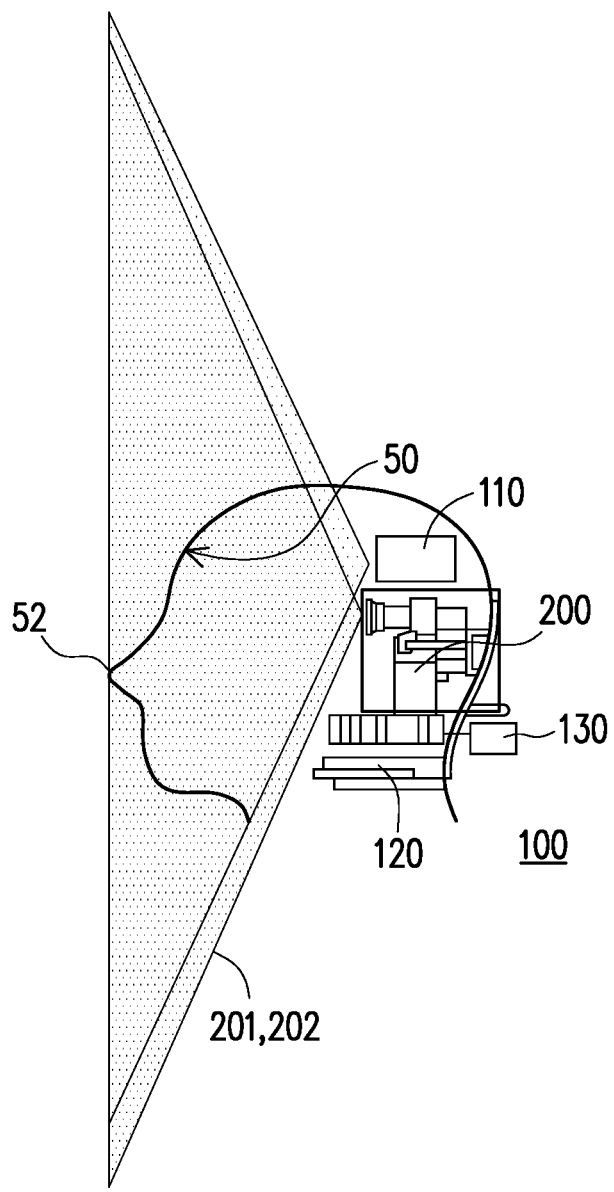
FIG. 1 is a schematic view showing a feature surface projection system according to an embodiment of the disclosure.

FIG. 1 is a schematic view showing a feature surface projection system according to an embodiment of the disclosure. Referring to FIG. 1, a feature surface projection system 100 of this embodiment includes a projector 200, a camera 110, and a controller 120. The projector 200 is configured to project a structured light 201 and an image beam 202 to a feature surface 50 at different times. The structured light 201 forms a structured light pattern on the feature surface 50, and the image beam 202 forms an image on the feature surface 50. In other words, in an embodiment, the projector 200 first projects the structured light 201 to the feature surface 50, and then projects the image beam 202 to the feature surface 50. In this embodiment, the feature surface 50 is, for example, the surface of a face mask, i.e., the surface of a human face-shaped casing, but is not limited thereto. In other embodiments, any non-planar surface may be the feature surface 50. When the structured light 201 is projected on a planar surface, for example, sets of dot patterns, grid patterns, stripe patterns, or various other possible patterns are formed on the planar surface. When the structured light 201 is projected on the non-planar feature surface 50, the sets of dot patterns, grid patterns, stripe patterns, or various other possible patterns are deformed due to the unevenness of the feature surface 50, and the amount and direction of the deformation may be used to calculate three-dimensional coordinates of positions on the feature surface 50. On the other hand, the image formed by the image beam 202 on the feature surface 50 is an image intended for a viewer to watch, which includes a content to be displayed.

The camera 110 is configured to photograph, at different times, the structured light pattern and the image formed by the image beam 202 on the feature surface 50. In other words, after the structured light is projected, the structured light pattern is photographed. Then, after the image beam 202 is projected, the image formed by the image beam 202 is photographed. The controller 120 is electrically connected to the projector 200 and the camera 110. The controller 120 is configured to calculate a position of a feature point of the feature surface 50 according to the structured light pattern and is configured to determine a difference between a position of a feature point of the image formed by image beam 202 on the feature surface 50 and the position of the feature point of the feature surface to determine whether to adjust the image beam. As those skilled in the art can clearly know, the adjustment may include, for example, changing the shape or size of the image.

In this embodiment, when the controller 120 determines that the difference between the position of the feature point of the image and the position of the feature point of the feature surface 50 exceeds a predetermined range (e.g., greater than a predetermined distance value, or greater than or equal to a predetermined distance value; for example, the predetermined distance value may be 1 cm but is not limited thereto), the controller 120 adjusts the relative position or orientation (direction of projection) of the projector 200 with respect to the feature surface 50 through an actuator 130 to reduce the difference between the position of the feature point of the image and the position of the feature point of the feature surface 50. For example, the actuator 130 may adjust the position of the projector 200. However, when the controller 120 determines that the difference between the position of the feature point of the image and the position of the feature point of the feature surface 50 falls within a predetermined range (e.g., less than or equal to a distance value, or less than a distance value; for example, the predetermined distance value may be 1 cm but is not limited thereto), the controller 120 does not adjust the relative position or orientation of the projector 200 with respect to the feature surface 50.

In this embodiment, the feature points of the feature surface 50 and the image include at least one of a nose tip 52, an eye corner, a mouth corner, and an earlobe. For example, the controller 120 first determines the position of the feature surface 50 by using a central feature point, and then determines the orientation of the feature surface 50 by using a symmetric feature point. The central feature point includes the nose tip 52, and the symmetric feature point includes the eye corner, the mouth corner, or the earlobe.

In this embodiment, the projector 200 and the camera 110 are provided inside the face mask (e.g., provided inside the artificial head casing having the feature surface 50). In other words, the structured light 201 and the image beam 202 are projected toward the inner surface of the face mask, and the camera 110 photographs toward the inner surface of the face mask. The feature surface 50 is made of a light-transmitting material, which allows an external viewer of the feature surface 50 to view the image created by the image beam 202. When the controller 120 determines that the difference between the position of the feature point of the image and the position of the feature point of the feature surface 50 falls within the predetermined range, and the controller 120 does not adjust the relative position or orientation of the projector 200 with respect to the feature surface 50, the projector 200 stops projecting the structured light 201 but continues to project the image beam 202, and the camera 110 stops photographing. In that case, the structured light 201 may be visible light, since once the controller 120 determines that the difference between the position of the feature point of the image and the position of the feature point of the feature surface 50 falls within the predetermined range (i.e., when the controller 120 determines that the alignment is completed), the structured light 201 may no longer be projected, and the viewer can watch the image without seeing the structured light pattern. In addition, since the projector 200 and the camera 110 are fixed inside the artificial head casing, once the alignment is completed, the relative position between the projector 200 and the feature surface 50 will not change, and it is not necessary to continuously repeat the correction process. However, in another embodiment, the structured light 201 may also be invisible light or infrared light.

In this embodiment, the projection ranges of the structured light 201 and the image beam 202 are larger than the area range of the feature surface 50, so that correction can still be performed well and efficiently when the projector 200 and the feature surface 50 are misaligned.

In another embodiment, it is possible that the relative position between the projector 200 and the feature surface 50 is not corrected by the actuator 130, but the controller 120 may adjust the content of the image through software in the projector 200, i.e., directly changing the position of the feature point of the image in this image, so that the position of the feature point of the image is aligned with the position of the feature point of the feature surface 50. In other words, when the controller 120 determines that the difference between the position of the feature point of the image and the position of the feature point of the feature surface 50 exceeds the predetermined range, the controller 120 adjusts the content of the image through the projector 200 to reduce the difference between the position of the feature point of the image and the position of the feature point of the feature surface 50. When the controller 120 determines that the difference between the position of the feature point of the image and the position of the feature point of the feature surface 50 falls within the predetermined range, the controller does not adjust the content of the image.

Figure 2:
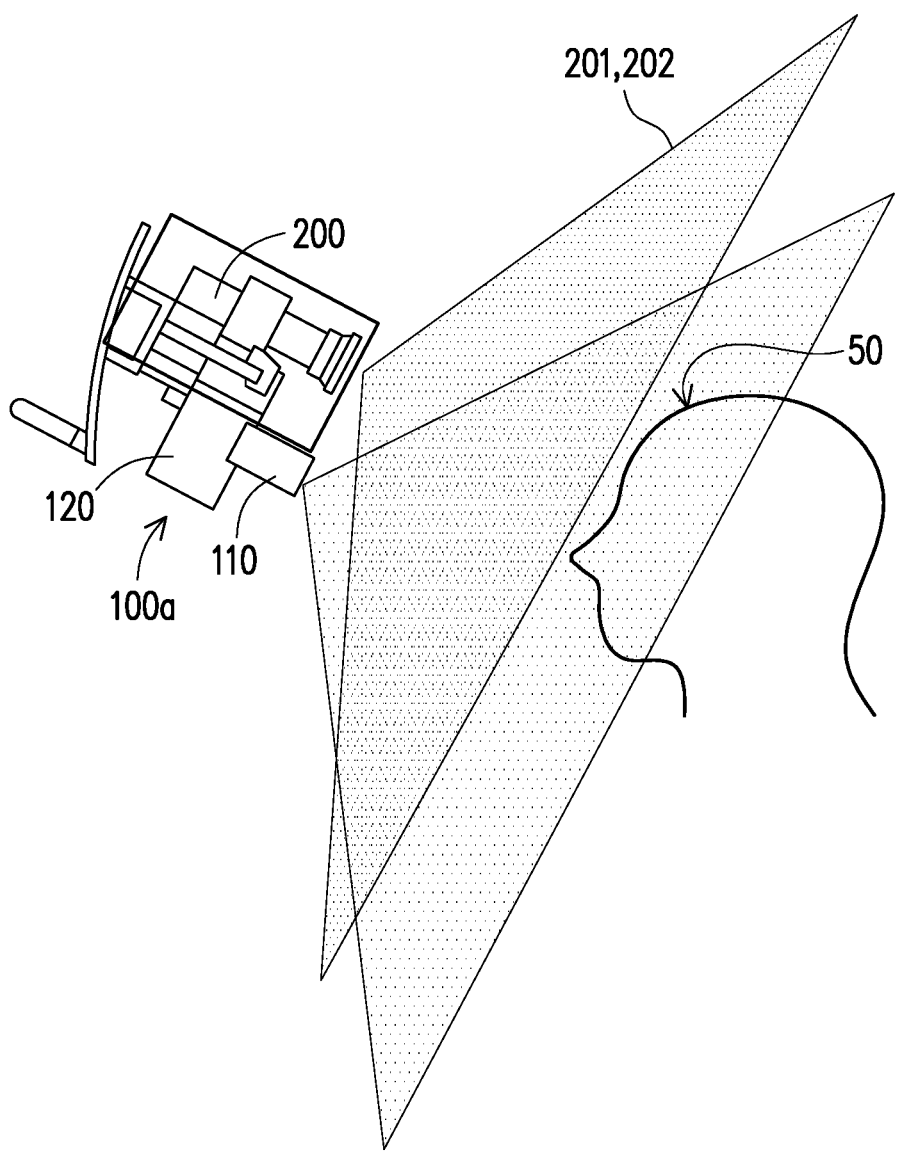
FIG. 2 is a schematic view showing a feature surface projection system according to another embodiment of the disclosure.

FIG. 2 is a schematic view showing a feature surface projection system according to another embodiment of the disclosure. Referring to FIG. 2, a feature surface projection system 100a of this embodiment is similar to the feature surface projection system 100 of FIG. 1, and the difference between the two lies in that the projector 200 and the camera 110 are provided outside the human face or face mask, where the feature surface 50 is the surface of the human face or the surface of the face mask. In other words, in an embodiment, the structured light 201 and the image beam 202 are projected toward the outer surface of the human face, and the camera 110 photographs toward the outer surface of the human face.

In addition, in this embodiment, the projector 200 repeatedly projects the structured light 201 and the image beam 202 alternately, the camera 110 continuously photographs the structured light pattern and the image alternately, and the controller 120 continuously determines whether to adjust the image beam 202 to keep projecting the correct image on the human face as the human face dynamically moves. The adjustment to the image beam 202 may include adjusting the position and orientation of the projector 200 through the actuator 130 to change the position and orientation of projection of the image beam 202. Alternatively, the controller 120 may also adjust the content of the image through the projector 200, so that the position of the feature point of the image is aligned with the position of the feature point of the feature surface 50. Accordingly, even if the position of the human body or human face continuously changes, the projector 200 can project the correct image on the human face. In addition, in that case, the structured light 201 may be infrared light, so that even if the structured light 201 is repeatedly projected on the feature surface 50, the viewer sees the image without seeing the structured light pattern.

Figure 3:
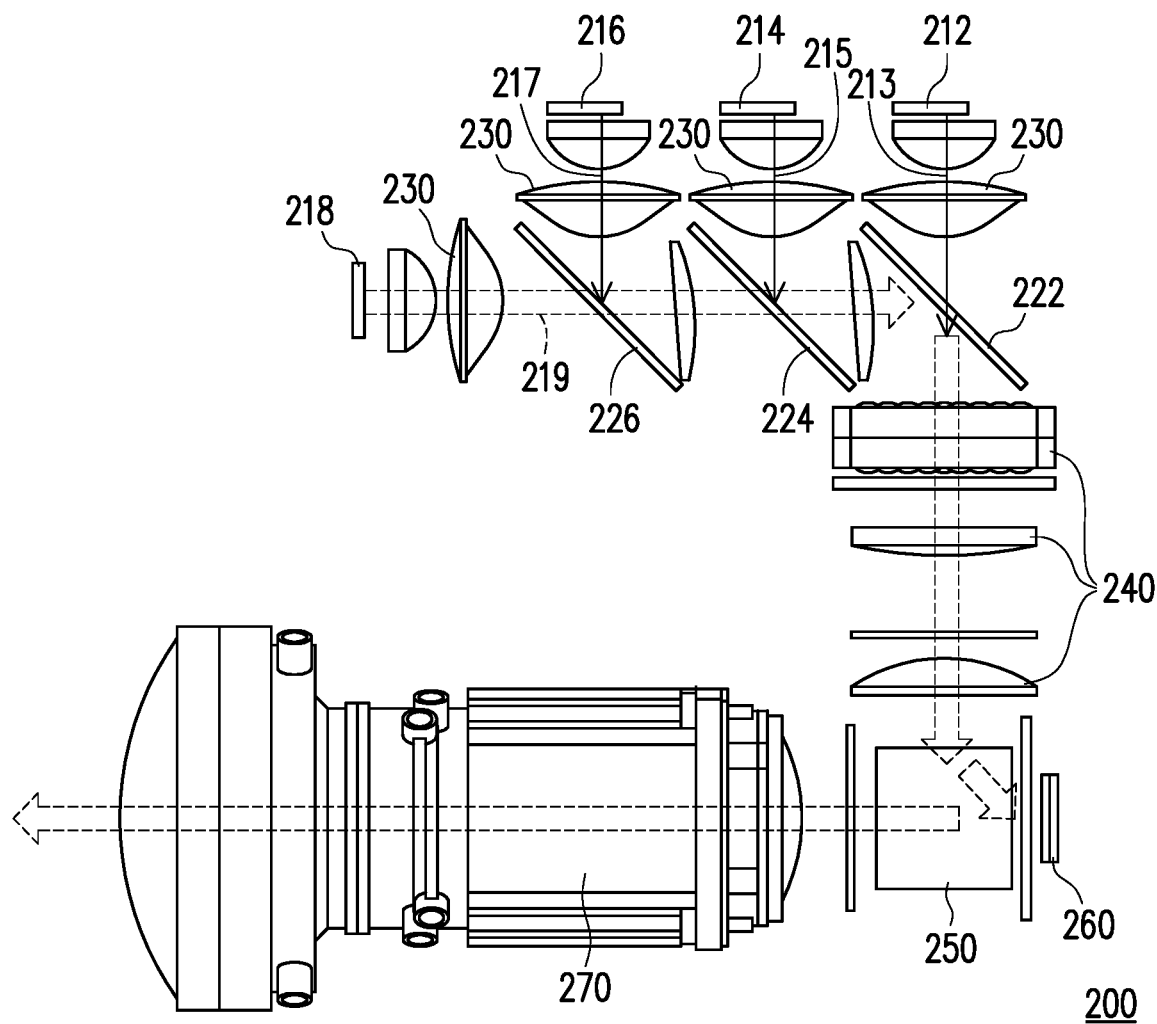
FIG. 3 is a schematic view showing an optical path of the projector in the case where the structured light in FIG. 1
Figure 4:
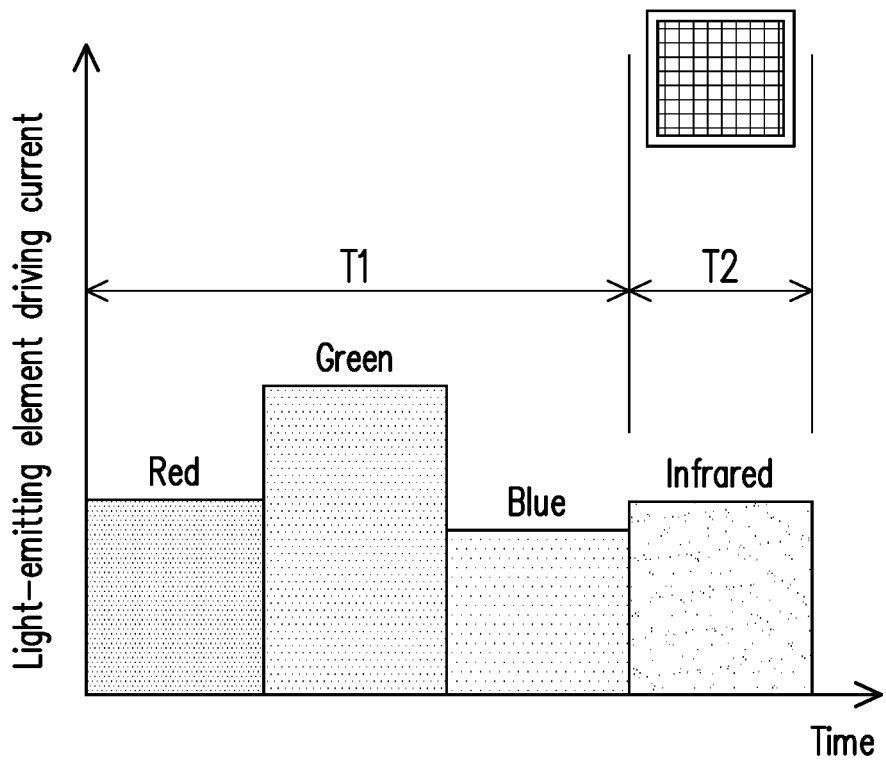
FIG. 4 is a schematic view showing driving signals of light-emitting elements in FIG. 3.

FIG. 3 is a schematic view showing an optical path of the projector in the case where the structured light in FIG. 1 or FIG. 2 is infrared light, and FIG. 4 is a schematic view showing driving signals of light-emitting elements in FIG. 3. Referring to FIG. 3 and FIG. 4, the projector 200 may include multiple light-emitting elements 212, 214, 216, and 218 having different light emission wavelengths, multiple dichroic mirrors 222, 224 and 226, multiple lenses 230 and 240, at least one light valve 260, and a projection lens 270. In this embodiment, the light-emitting elements 212, 214, 216, and 218 are, for example, a red light-emitting diode (LED), a green light-emitting diode, a blue light-emitting diode, and an infrared light-emitting diode. The dichroic mirrors 222, 224, and 226 combine a red light 213, a green light 215, a blue light 217, and an infrared light 219 emitted by the light-emitting elements 212, 214, 216, and 218, and the combined light is converged on the at least one light valve 260 through the uniformization, transmission, and convergence of the multiple lenses 240. In addition, the multiple lenses 230 transmit the red light 213, the green light 215, the blue light 217, and infrared light 219 onto the dichroic mirrors 222, 224, and 226. In other embodiments, the light-emitting elements 212, 214, 216, and 218 may be replaced with laser light sources which generate lights of different colors.

In this embodiment, the light-emitting elements 212, 214, 216, and 218 emit the red light 213, the green light 215, the blue light 217, and the infrared light 219 in time sequence, and the light valve 260 sequentially converts the red light 213, the green light 215, the blue light 217, and the infrared light 219 into a red image beam, a green image beam, a blue image beam, and the structured light 201. Through the projection lens 270, the red image beam, the green image beam, the blue image beam, and the structured light 201 are projected to the feature surface 50. The red image beam, the green image beam, and the blue image beam may be superimposed on the time axis to form the image beam 202 to thereby form a color image on the feature surface 50.

In addition, the projector 200 may further include a total internal reflection prism (TIR prism) 250, which transmits the red light 213, the green light 215, the blue light 217, and the infrared light 219 to the light valve 260, and transmits the red image beam, the green image beam, the blue image beam, and the structured light 201 from the light valve 260 to the projection lens 270. However, in other embodiments, a field lens or a reflection mirror may also be adopted to replace the total internal reflection prism 250. In addition, in this embodiment, the light valve 260 is, for example, a digital micro-mirror device (DMD). However, in other embodiments, the light valve 260 may also be a liquid-crystal-on-silicon panel (LCOS panel) or a transmissive LCD panel, but is not limited thereto.

As shown in FIG. 4, in a time period T1, the current sequentially drives the light-emitting elements 212, 214, and 216, so that the light-emitting elements 212, 214, and 216 sequentially emit the red light 213, the green light 215, and the blue light 217. In a time period T2, the current drives the light-emitting element 218, so that the light-emitting element 218 emits the infrared light 219. The time period T1 and the time period T2 may be alternately repeated.

The feature surface projection system 100 of the above embodiment may execute a projection method for a feature surface including the following steps.

1. A structured light 201 and an image beam 202 are projected to the feature surface 50 at different times, where the structured light 201 forms a structured light pattern on the feature surface, and the image beam 202 forms an image on the feature surface.
2. The structured light pattern and the image are photographed at different times.
3. A position of a feature point of the feature surface 50 is calculated according to the structured light pattern.
4. A difference between a position of a feature point of the image and the position of the feature point of the feature surface 50 is determined to determine whether to adjust the image beam 202.

Figure 5:
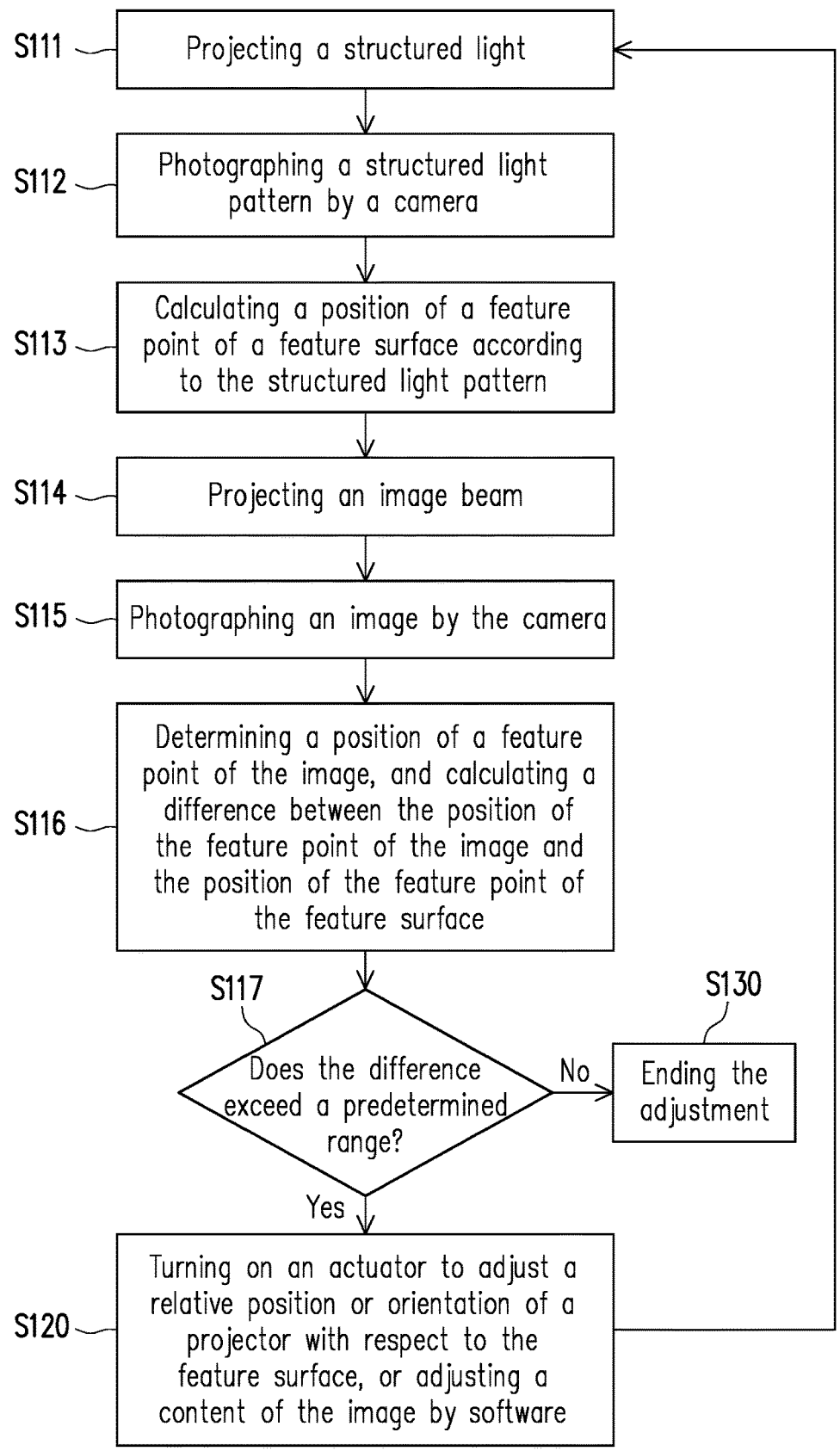
FIG. 5 shows process details of a projection method for a feature surface according to an embodiment of the disclosure.
Figure 6:
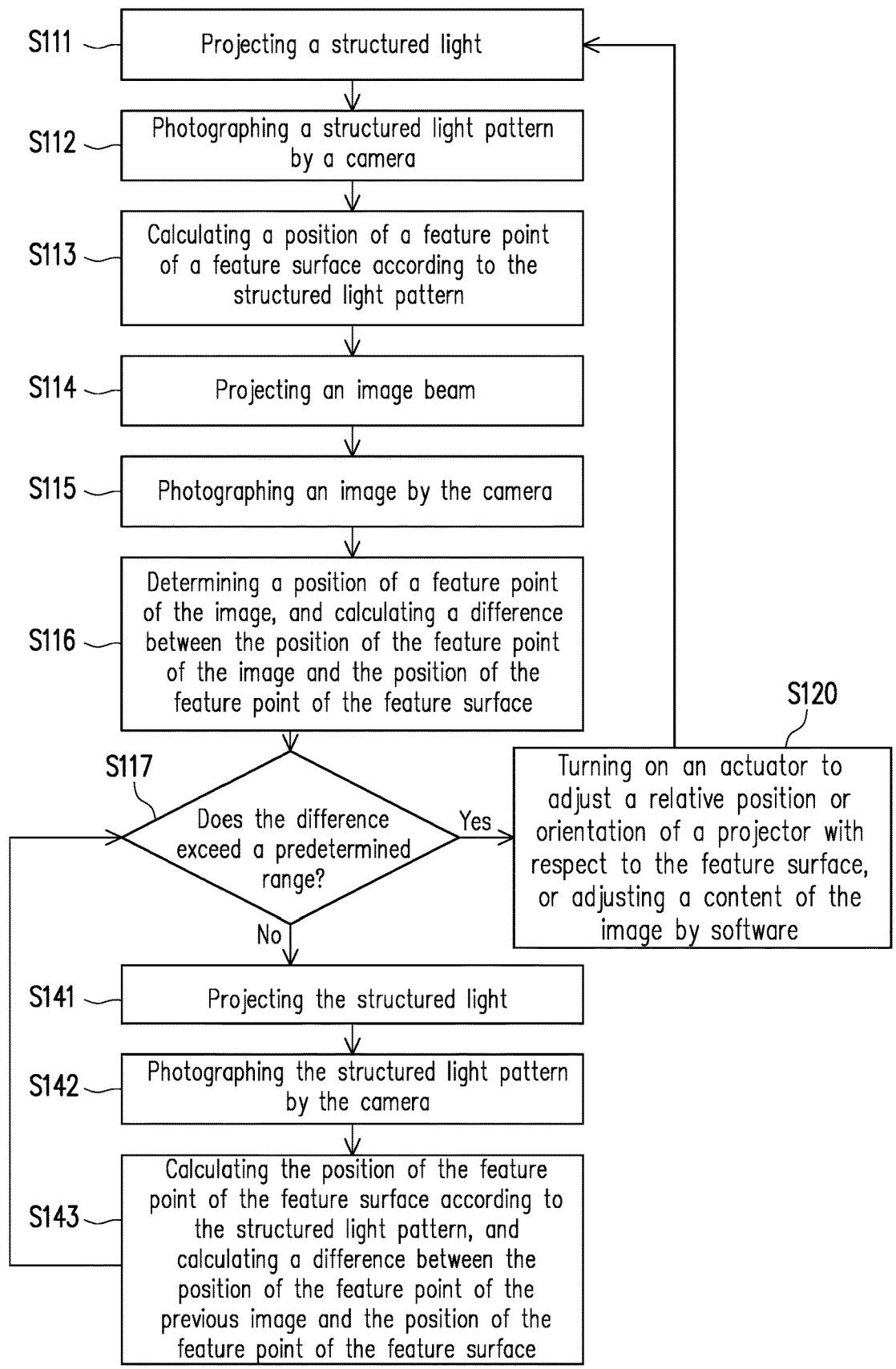
FIG. 6 shows process details of a projection method for a feature surface according to another embodiment of the disclosure.

The detailed steps may be executed by adopting the process shown in FIG. 5 or FIG. 6. The process of FIG. 5 may be applied to the feature surface projection system 100 of FIG. 1 and includes the following steps. First, in step S111, a structured light 201 is projected so that the structured light 201 is irradiated on the feature surface 50. Next, in step S112, the camera 110 photographs a structured light pattern. Then, in step S113, the controller 120 calculates a position of a feature point of the feature surface 50 according to the structured light pattern. Afterwards, in step S114, an image beam 202 is projected so that the image beam 202 is projected on the feature surface 50 to form an image on the feature surface 50. Then, in step S115, the camera 110 photographs the image. Then, in step S116, the controller 120 determines a position of a feature point of the image, and calculates a difference between the position of the feature point of the image and the position of the feature point of the feature surface 50. Afterwards, in step S117, the controller 120 determines whether the difference exceeds a predetermined range. If not, the adjustment is ended (step S130). If yes, the actuator 130 is turned on to adjust the relative position or orientation of the projector 200 with respect to the feature surface 50, or a content of the image is adjusted by software, and returning to step S111 to form a cycle and continue to execute the steps after step S111.

The process of FIG. 6 may be applied to the feature surface projection system 100a of FIG. 2 and is similar to the process of FIG. 5. The main differences between the two will be described below. In the process of FIG. 6, when the determination result in step S117 is NO, step S141 is executed to project the structured light 201 so that the structured light pattern is projected on the feature surface 50. Next, in step S142, the camera photographs the structured light pattern. Then, in step S143, the position of the feature point of the feature surface 50 is calculated according to the structured light pattern, and a difference between the position of the feature point of the previous image and the position of the feature point of the feature surface 50 is calculated, and returning to step S117 to form a cycle. Accordingly, correction can be constantly performed as the human face or face mask dynamically moves, so that the image projected on the human face or face mask remains correct.

In an embodiment, the controller 120 is, for example, a central processing unit (CPU), a microprocessor, a digital signal processor (DSP), a programmable controller, a programmable logic device (PLD), another similar device, or a combination of the above devices, but the disclosure is not limited thereto. In addition, in an embodiment, the functions of the controller 120 may be implemented by multiple program codes. The program codes are stored in a memory and are executed by the controller 120. Alternatively, in an embodiment, the functions of the controller 120 may be implemented by one or more circuits. The disclosure does not specifically limit the functions of the controller 120 to be implemented by software or hardware. Further, the execution of each step in the processes of FIG. 5 and FIG. 6 may be controlled by the controller 120.

In summary of the above, in the feature surface projection system and the projection method for a feature surface of the embodiments of the disclosure, since the structured light and the image beam are projected to the feature surface at different times, and the structured light pattern and the image are photographed at different times, it is possible to align the projected content with the feature surface to thereby improve the accuracy and the visual effect of the projected image.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A feature surface projection system comprising a projector, a camera, and a controller, wherein
the projector is configured to project a structured light and an image beam to a feature surface at different times, wherein the structured light forms a structured light pattern on the feature surface, and the image beam forms an image on the feature surface,
the camera is configured to photograph the structured light pattern and the image at different times, and
the controller is electrically connected to the projector and the camera, is configured to calculate a position of a feature point of the feature surface according to the structured light pattern, and is configured to determine a difference between a position of a feature point of the image and the position of the feature point of the feature surface to determine whether to adjust the image beam,
wherein the controller is configured not to adjust a relative position or orientation of the projector with respect to the feature surface when the difference between the position of the feature point of the image and the position of the feature point of the feature surface falls within a predetermined range, and the projector is configured to stop projecting the structured light but continue to project the image beam, and the camera is configured to stop photographing,
the feature surface is a surface of a face mask, and the projector and the camera are provided inside the face mask.

2. The feature surface projection system according to claim 1, wherein when the controller determines that the difference between the position of the feature point of the image and the position of the feature point of the feature surface exceeds the predetermined range, the controller adjusts a content of the image through the projector to reduce the difference between the position of the feature point of the image and the position of the feature point of the feature surface, and
when the controller determines that the difference between the position of the feature point of the image and the position of the feature point of the feature surface falls within the predetermined range, the controller does not adjust the content of the image.

3. The feature surface projection system according to claim 1, wherein when the controller determines that the difference between the position of the feature point of the image and the position of the feature point of the feature surface exceeds the predetermined range, the controller adjusts the relative position or orientation of the projector with respect to the feature surface through an actuator to reduce the difference between the position of the feature point of the image and the position of the feature point of the feature surface.

4. The feature surface projection system according to claim 1, wherein feature points of the feature surface and the image comprise the surface of the face mask corresponding to at least one of a nose tip, an eye corner, a mouth corner, and an earlobe of a human face.

5. The feature surface projection system according to claim 1, wherein the controller first determines a position of the feature surface by using a central feature point, and then determines an orientation of the feature surface by using a symmetric feature point, wherein the central feature point comprises the surface of the face mask corresponding to a nose tip of a human face, and the symmetric feature point comprises the surface of the face mask corresponding to an eye corner, a mouth corner, or an earlobe of the human face.

6. The feature surface projection system according to claim 1, wherein projection ranges of the structured light and the image beam are larger than a range of the feature surface.

7. The feature surface projection system according to claim 1, wherein the structured light is infrared light.

8. The feature surface projection system according to claim 1, wherein the structured light is visible light.

9. A projection method for a feature surface, adapted for projecting on a feature surface, the projection method comprising:
projecting a structured light and an image beam to the feature surface at different times, wherein the structured light forms a structured light pattern on the feature surface, and the image beam forms an image on the feature surface;
photographing the structured light pattern and the image at different times;
calculating a position of a feature point of the feature surface according to the structured light pattern; determining a difference between a position of a feature point of the image and the position of the feature point of the feature surface to determine whether to adjust the image beam; and
not adjusting a relative position or orientation of a projector with respect to the feature surface, and stopping projecting the structured light but continuing to project the image beam, and stopping photographing when the difference between the position of the feature point of the image and the position of the feature point of the feature surface falls within a predetermined range,
wherein the feature surface is a surface of a face mask, the structured light and the image beam are projected toward an inner surface of the face mask, and the camera photographs toward the inner surface of the face mask.

10. The projection method for a feature surface according to claim 9, wherein when it is determined that the difference between the position of the feature point of the image and the position of the feature point of the feature surface exceeds the predetermined range, a content of the image is adjusted to reduce the difference between the position of the feature point of the image and the position of the feature point of the feature surface, and
when it is determined that the difference between the position of the feature point of the image and the position of the feature point of the feature surface falls within the predetermined range, the content of the image is not adjusted.

11. The projection method for a feature surface according to claim 9, wherein when it is determined that the difference between the position of the feature point of the image and the position of the feature point of the feature surface exceeds the predetermined range, the relative position or orientation of the projector, which projects the structured light and the image beam, with respect to the feature surface is adjusted through an actuator to reduce the difference between the position of the feature point of the image and the position of the feature point of the feature surface.

12. The projection method for a feature surface according to claim 9, wherein feature points of the feature surface and the image comprise the surface of the face mask corresponding to at least one of a nose tip, an eye corner, a mouth corner, and an earlobe of a human face.

13. The projection method for a feature surface according to claim 9, wherein the step of calculating the position of the feature point of the feature surface according to the structured light pattern comprises:
  first determining a position of the feature surface by using a central feature point, and then determining an orientation of the feature surface by using a symmetric feature point, wherein the central feature point comprises the surface of the face mask corresponding to a nose tip of a human face, and the symmetric feature point comprises the surface of the face mask corresponding to an eye corner, a mouth corner, or an earlobe of the human face.

14. The projection method for a feature surface according to claim 9, wherein projection ranges of the structured light and the image beam are larger than a range of the feature surface.

\* \* \* \* \*